COMPUTER LOGIC CIRCUIT

Filed July 20, 1961 2 Sheets-Sheet 1

WITNESSES
John E. Healey, Jr.
James F. Young

INVENTORS
Harold D. Ausfresser &
Richard D. French
BY P. J. Brodahl
ATTORNEY 3,189,754

COMPUTER LOGIC CIRCUIT

Harold D. Ausfresser, Baltimore, and Richard D. French, Arnold, Md., assignors to Westinghouse Electric Corporation, East Pittsburgh, Pa., a corporation of Pennsylvania Filed July 20, 1961, Ser. No. 125,504

11 Claims. (Cl. 307—88.5)

The present invention relates generally to computer logic circuits and more particularly to a multiple tunnel diode, double threshold gating circuit.

The advent of the tunnel diode has given rise to multiple logic circuits utilizing the high switching speeds of the diode. A logic circuit in accordance with the present invention provides a flexibility which may be implemented into a multitude of different logic gate types, such as the Inverter, And, Or, Majority. The utilization of a double threshold level as provided by the input circuit and the output circuit of the present invention allows such functions to be obtained as the And-And, Or-Or, And-Or, Or-And, Nand, Nor, Or-Nor, And-Nor, and many others.

Accordingly, an object of the present invention is to provide a logic circuit utilizing the high switching speed of the tunnel diode.

Another object of the present invention is to provide a logic circuit which can be implemented into a multitude of different logic gate types.

Another object of the present invention is to provide a logic circuit which is less expensive and easier to fabricate then circuits of the prior art.

Another object of the present invention is to provide a logic circuit permitting wider manufacturing tolerances than permitted in single tunnel diode logic circuits of the prior art.

Further objects and advantages of the present invention will be readily apparent from the following detailed description taken in conjunction with the drawing in which.

Figure 1:
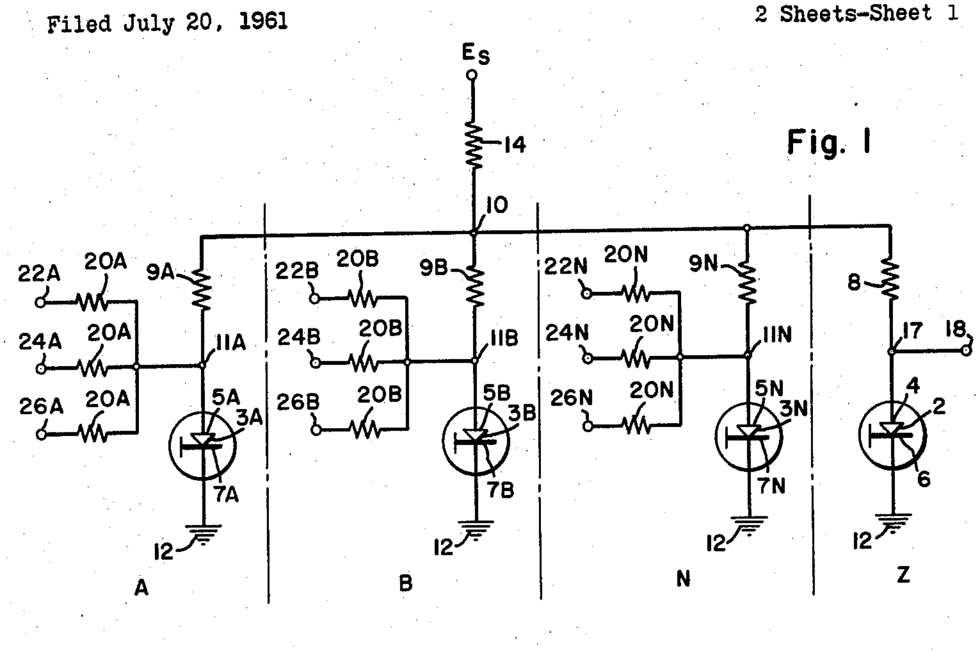
FIG. 1 is an electrical schematic diagram of an illustrative embodiment of the present invention.

Referring to FIG. 1, an output circuit *z*, comprising a tunnel diode 2 having an anode 4 and a cathode 6, and an output biasing resistor 8 connected in series circuit combination, is connected from a junction hereinafter referred to as the common junction 10 to a point of reference potential or ground 12. The anode 4 of the diode 2 is connected to the resistor 8 while the cathode 6 is connected to ground 12.

A plurality of input circuits A, B, . . . N are each connected across the output circuit Z by connection between the common junction 10 and ground 12. Each input circuit A, B, . . . N comprises an input tunnel diode 3 having an anode 5 and a cathode 7 and an input biasing resistor 9 connected in series circuit combination with the anode 5 connected to the resistor 9 and the cathode 7 connected to ground 12.

A biasing potential is connected across each input circuit and the output circuit through a supply resistor 14 adapted to be connected to a voltage supply source $E_s$. The proper selection of the biasing potential across each of the parallel circuits will be discussed hereinafter.

Figure 2:
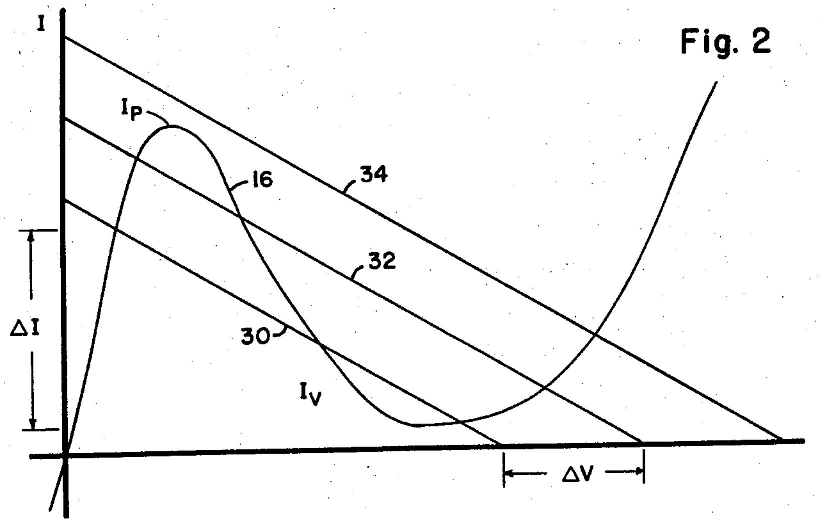
FIG. 2 is a characteristic curve of a device utilized in the illustrative embodiment shown in FIG. 1.

The logic circuit shown in the illustrative embodiment of FIG. 1 utilizes tunnel diode devices each having similar characteristic current-voltage curves as represented by the curve 16 in FIG. 2. For reverse bias, the resistance of the tunnel diode is small and current increases greatly with increasing voltage. In the forward direction of voltage across the tunnel diode, the current therethrough increases to a sharp maximum $I_p$ on a portion of the characteristic curve referred to as the low voltage side. Further increase in the voltage across the diode results in the negative resistance portion of the characteristic curve wherein the current through the diode drops to a deep and broad minimum, referred to as the valley current $I_v$. Still further increase in the voltage across the diode causes the current to increase again on a portion of the characteristic curve to be referred to as the high voltage side to a maximum value determined by the maximum voltage appearing across the diode in accordance with the circuit parameters of the logic network. The breakover current level as determined by the peak tunneling current $I_p$ is hereinafter referred to as the current threshold level of the diode. For the purposes of this specification, the term tunnel diode is means to include all devices exhibiting the aforementioned characteristics.

It is to be noted that for a chosen load line an operating point on the low voltage side of the curve results in the diode being in a low voltage state while the diode when at an operating point on the high voltage side of its characteristic curve results in the diode being in a high voltage state.

Referring again to FIG. 1 each iniput circuit A,B, . . . N has connected thereto a plurality of input means connected to their respective input circuit at a connecting junction 11 being between their respective biasing resistors 9 and input tunnel diodes 3. Each input means is illustrated to be a resistive element 20 having one end connected to the common junction 11 and its opposite end connected to a respective input terminal 22, 24, . . . 26. At the same time an output means is connected to the output circuit Z at the common junction 17 between the output biasing resistor 8 and the output tunnel diode 2. The output means which includes output terminal 18 is connected to be responsive to the voltage state of the output tunnel diode 2 for providing an output signal at the terminal 18.

Assuming an input signal of per unit magnitiude at one or more of the input terminals 22, 24, . . . 26, it can be seen that for each such input signal the current through the respective input tunnel diode 3 is proportionally increased. In operation, the input tunnel diodes 3 and the output tunnel diode 2 are all biased to their low voltage state as, for example, determined by a load line 30. As the input current through a selected input tunnel diode is increased in response to a per unit input signal at one of its input terminals the total current through the input tunnel diode will increase proportionately. When a sufficient number of input signals have simultaneously occured at its respective input terminals to exceed the current threshold level of the diode 3 in that input circuit, the tunnel diode 3 will switch to its high voltage state. The switching process of a particular input tunnel diode 3 causes a decrease in current $\Delta I$ in its respective bias resistor 9 which in turn will cause an increase in voltage $\Delta V$ at the common junction point 10. The incremental increase in voltage, $\Delta V$ at the common junction point 10 causes the load line of each other input circuit and the output circuit Z to shift higher and closer to its respective peak current $I_p$. From FIG. 2 it can be seen that for one input tunnel diode 3 to switch to its high voltage state the load line assumes a position as indicated at 32. When still another input tunnel diode 3 switches to its high voltage state in response to a predetermined number of input signals at its input circuit, a load line 34 will be established across the output tunnel diode 2 which indicates that a sufficient number of input tunnel diodes 3 have switched to their high voltage state to have increased the current through the output tunnel diode 2 sufficiently to exceed its respective current threshold level $I_p$ and hence cause the output diode to switch to its high voltage state. By proper selection of the circuit parameters the increase in voltage across the tunnel diode 2, which, in turn, appears at the output terminal 18 is preselected to be equivalent to a per unit signal such as a binary "one" or a per unit output voltage level capable of connection into a following logic circuit of similar design. The output terminal 18 may be connected as desired to an input terminal 22 or 24 or 26 of a following logic circuit.

Briefly, when one input tunnel diode switches to its high voltage state, the incremental increase in voltage and current across the output tunnel diode 2 moves the load line to position 32. More input signals per unit value to input terminals of other input circuits may occur until finally enough input tunnel diodes have switched to their high voltage state to increase the current through the output diode to a magnitude in excess of the current threshold level of the output tunnel diode 2.

As one input tunnel diode and then another assumes its high voltage state the load line moves outward with increasing bias voltage across the output tunnel diode until only one steady state operating point is established by the load line 34, namely a high voltage state on the high voltage side of the characteristic curve 16 shown in FIG. 2.

Figure 3:
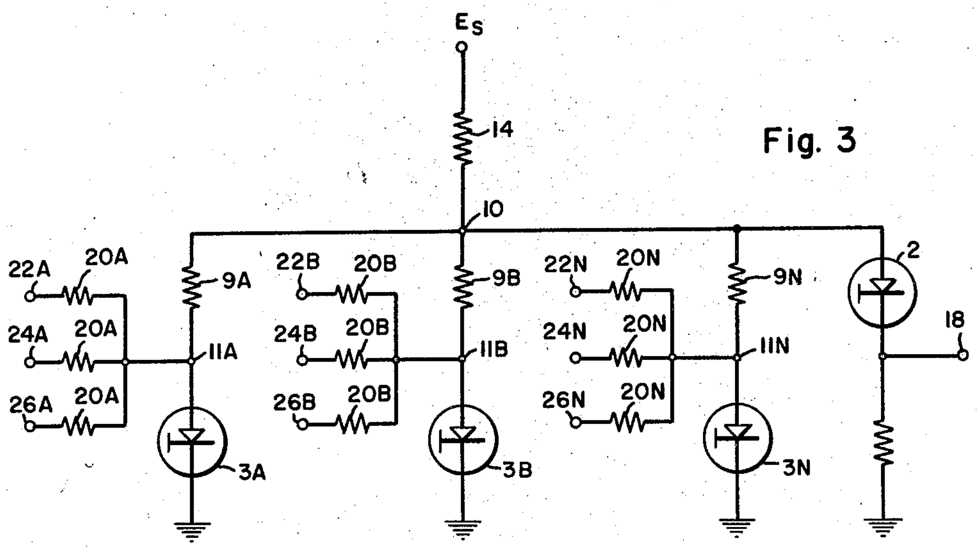
FIG. 3 is an electrical schematic diagram of an alternate embodiment of the present invention.

The alternate embodiment shown in FIG. 3 has been provided identical reference characters for similar devices shown in FIG. 1. It is to be noted that the output circuit has been altered by interchanging the output tunnel diode 2 and the output biasing resistor 8 whereby an inverted output may be obtained from the logic circuit. Therefore when the output tunnel diode assumes its high voltage state the voltage across the biasing resistor will be greatly reduced so that the output terminal 18 will assume a low voltage state when the output tunnel diode 2 assumes its high voltage state. Of course, both a non-inverted and an inverted output from the same logic circuit may be had by merely paralleling two output circuits having interchanged output biasing resistors in output tunnel diodes.

Figure 4:
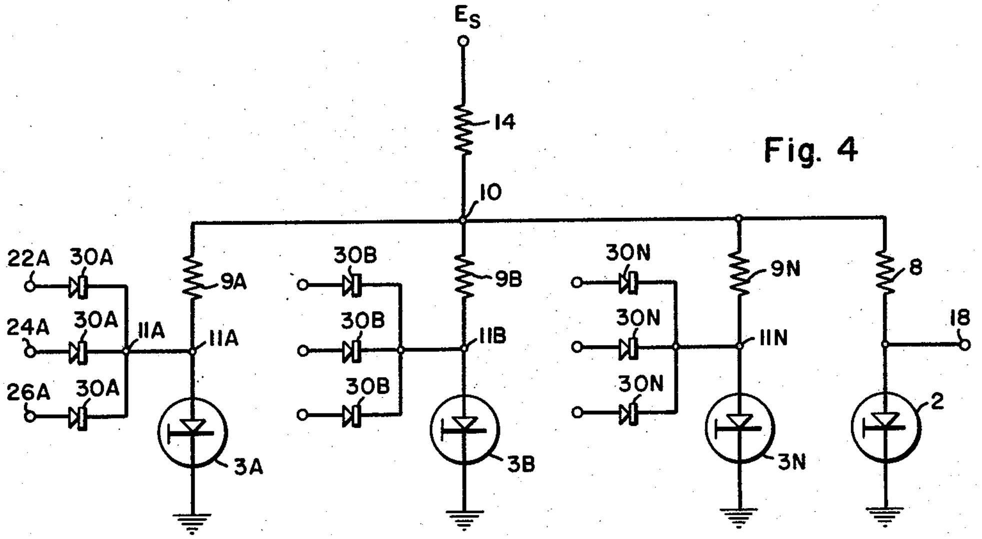
FIG. 4 is an electrical schematic diagram of another alternate embodiment of the present invention.

Another alternate embodiment is shown in FIG. 4. The plurality of input means associated with each input circuit now comprises a rectifier element 30 in each input circuit between a respective input terminal 22, 24, . . . 26 and its junction 11. The rectifier elements 30 are poled to block current flow from its respective input circuit to a preceding logic circuit thereby protecting the connected preceding logic circuit from spurious signals resulting from the operating of a following logic circuit.

Further modifications in accordance with the present invention may be had by replacing the supply resistor 14 with another tunnel diode or an inductor for connecting the input circuits and the output circuits to a voltage supply source $E_s$.

If the supply resistor 14 or another tunnel diode is used as the biasing element, the logic circuit may be reset to its low voltage state in preparation for another sequence of input signals by either disconnecting the bias voltage supply $E_s$ and then reconnecting the supply, or by applying a negative current pulse to each tunnel diode. A negative current pulse applied to the common junction 10 would suffice to reset the logic circut. Automatic reset can be provided as well by using the inductor in the bias circuit.

Thus, it is readily apparent, that the foregoing invention has provided many logical advantages and further permitted a wider tolerance of the devices utilized. By paralleling the input circuits with the output circuits the variants in circuit parameters are averaged over all of the parallel circuits so that a greater uniformity of response to input signals of per unit value is attained.

While the present invention has been described with a degree of particularity for the purposes of illustration, it is to be understood that all alterations, modifications and equivalents within the spirit and scope of the present invention are herein meant to be included.

We claim as our invention:

1. A double threshold gate circuit comprising, in combination; a plurality of input circuits connected in parallel circuit relationship and each including an input tunnel diode and an input biasing resistor connected in series circuit combination; an output circuit connected in parallel circuit relationship with said plurality of input circuits and including an output tunnel diode and an output biasing resistor connected in series circuit relationship; each said tunnel diode having a preselected current threshold level and exhibiting a characteristic current-voltage curve having a low voltage state and a high voltage state; means for biasing each tunnel diode to its low voltage state; input means for each said input circuit for selectively exceeding the threshold current level of its respective tunnel diode, whereby the threshold level of said output tunnel diode is exceeded upon breakover of a predetermined number of said input tunnel diodes.

2. The apparatus of claim 1 wherein said output tunnel diode has a current threshold level preselected to be greater than the current threshold level of any said input tunnel diodes.

3. A logic circuit comprising, in combination; a plurality of input circuits connected as parallel circuit combination and each including a tunnel diode and a biasing resistor connected in series circuit relationship; each said input tunnel diode having a preselected current threshold level and exhibiting a characteristic current-voltage curve having a low voltage state and a high voltage state; an output circuit connected in shunt with said parallel circuit combination and including an output tunnel diode and an output biasing resistor connected in series circuit relaticnship; a common resistor element connected in series circuit relationship with said parallel circuit combination and said output circuit; means for providing a constant current through said common resistive element and sharing said constant current through each input circuit and said output circuit, the division of constant current in the input and outpjut circuits being so proportioned that each tunnel diode is biased to its low voltage state; input means for each said input circuit for selectively exceeding the threshold current level of its associated input tunnel diode whereby the voltage across the output tunnel diode and the current therethrough will increase as a function of the number of input tunnel diodes assuming their high voltage states; and output means responsive to the voltage state of said output tunnel diode for providing an output signal.

4. A logic circuit comprising, in combination: an output circuit including an output tunnel diode and an output biasing resistor connected in series circuit combination; a resistive element connected in circuit with said output circuit; said output tunnel diode having a preselected current threshold level and exhibiting a characteristic ampere-current curve having a low voltage state and a high voltage state; means for connecting a biasing source through said resistance element to said output circuit to provide a current through said output tunnel diode in excess of its current threshold level; means for connecting a plurality of shunt circuits across said output circuit to shunt current from said output circuit to an extent that the current through said output circuit is insufficient to exceed its current threshold level; each said shunt circuit including a respective tunnel diode; and means for increasing the current through said output circuit; said last-mentioned means comprising a plurality of input circuits for each shunt circuit for selectively reducing the current through its respective shunt circuit in response to the predetermined combination of input signals to increase the current through said output circuit to a level in excess of the current threshold level of said output tunnel diode; and output means responsive to the voltage state of said output tunnel diode for providing an output signal.

5. A logic circuit comprising, in combination; an output circuit including an output tunnel diode an an output biasing resistor connected in series circuit combination; a plurality of input circuits each comprising a respective input tunnel diode and a respective biasing resistor connected in series circuit combination; all said biasing resistors selected to have a magnitude for biasing its associated tunnel diode to have two stable states namely, a low voltage state and a high voltage state; biasing means for biasing each tunnel diode to its respective low voltage state; and input means for each said input circuit for selectively rendering its respective input tunnel diode to its high voltage state whereby the voltage across said output tunnel diode will increase as a function of the number of input tunnel diode assuming their output states and said output tunnel diode will assume its second stable state namely, its high voltage state in response to a predetermined number of input tunnel diodes having assumed their high voltage state.

6. The apparatus of claim 5 in which each of said input means comprises a resistive element.

7. The apparatus of claim 5 in which each of said input means comprises a semiconductor diode poled to allow current flow toward its respective input tunnel diode circuit.

8. The apparatus of claim 5 including output means responsive to the inversion of the voltage state of said output tunnel diode for providing an output signal.

9. A logic circuit comprising, in combination; an output circuit including an output tunnel diode and an output biasing resistor connected in series circuit combination; a plurality of input circuits each comprising an input tunnel diode and an input biasing resistor connected in series circuit combination; means for connecting each said input circuits and said output circuit in parallel circuit relationship; means for biasing each said tunnel diode to its low voltage state; output means responsive to the voltage state of said output tunnel diode for providing a binary one signal when said output tunnel diode is in its low voltage state and providing a binary zero signal when said output tunnel diode is in its high voltage state; and input means operatively connected to each said input circuit for providing binary one and binary zero signals to each said input tunnel diode for selectively rendering said diodes to their high voltage states.

10. A logic circuit comprising, in combination; an output circuit including an output tunnel diode and an output biasing resistor connected in series circuit relationship; a plurality of input circuits connected in parallel circuit combination with each other and with said output circuit and each including a respective input tunnel diode and a respective biasing resistor connected in series circuit combination; each said tunnel diode having a current threshold level and a low voltage state and a high voltage state; output means responsive to the high voltage state of said output tunnel diode for providing a binary one output signal and responsive to the low voltage state of said output tunnel diode for providing a binary zero output signal; input means for each input circuit; each said input means responsive to a predetermined combination of binary one input signals for rendering its respective input tunnel diode to its high voltage state by exceeding the current threshold level of the respective input tunnel diode; said output tunel diode being rendered to its high voltage state upon a predetermined number of said input tunnel diodes assuming their high voltage states.

11. The apparatus of claim 10 wherein said input means each comprise a plurality of input resistors parallelly connected to the junction of the input tunnel diode and biasing resistor of its respective input circuit.

References Cited by the Examiner

UNITED STATES PATENTS

| | | | |
|---|---|---|---|
| 2,892,044 | 6/59 | Fairstein | 179—171 |
| 2,944,164 | 7/60 | Odell et al. | 307—88.5 |

OTHER REFERENCES

Brown et al.: "Transistors . . .," Control Engineering, December 1956 (pages 70–76), page 71 relied on).

G. E. Tunnel Diode Manual, March 1961 (page 43 relied on).

Chow, et al: ""Tunnel Diode Circuit Aspects . . .," A.I.E.E. Conference paper CP–60–297, Jan. 1960, page 26.

Kunikiro: "Applications of Tunnel diodes . . .," U. of Illinois Graduate College Digital Computer Lab. Report No. 103, Oct. 26, 1960, (pages 10 and 12 relied on).

Lewin: "Negative-Resistance Elements as Digital Computer Components," 1959 Proceedings of the Eastern Joint Computer Conference, Dec. 3, 1959, (pages 15 to 27) (pages 20 and 23 relied on).

ARTHUR GAUSS, *Primary Examiner.*

JOHN W. HUCKERT, *Examiner.*